United States Patent
Xam-Mar Mangrane

(10) Patent No.: US 11,413,120 B2
(45) Date of Patent: Aug. 16, 2022

(54) METHOD FOR MANUFACTURING A DENTAL STRUCTURE, DENTAL STRUCTURE OBTAINED AND DENTAL ASSEMBLY FORMED BY A STRUCTURE SCREWED ON A DENTAL IMPLANT

(71) Applicant: TALLADIUM ESPANA, S.L., Lleida (ES)

(72) Inventor: Esteban Xam-Mar Mangrane, Lleida (ES)

(73) Assignee: TALLADIUM ESPANA, S.L., Lleida (ES)

( * ) Notice: Subject to any disclaimer, the term of this patent is extended or adjusted under 35 U.S.C. 154(b) by 863 days.

(21) Appl. No.: 16/071,565

(22) PCT Filed: Jan. 21, 2016

(86) PCT No.: PCT/ES2016/070030
§ 371 (c)(1),
(2) Date: Jul. 20, 2018

(87) PCT Pub. No.: WO2017/125621
PCT Pub. Date: Jul. 27, 2017

(65) Prior Publication Data
US 2019/0021824 A1    Jan. 24, 2019

(51) Int. Cl.
*A61C 8/00* (2006.01)
*A61C 13/08* (2006.01)
(Continued)

(52) U.S. Cl.
CPC .......... *A61C 8/0068* (2013.01); *A61C 8/0012* (2013.01); *A61C 8/0048* (2013.01);
(Continued)

(58) Field of Classification Search
CPC ........ A61C 8/00–0098; A61C 13/0004; A61C 13/0006; A61C 13/08; B29C 2793/00; B29L 2031/7536
(Continued)

(56) References Cited

U.S. PATENT DOCUMENTS

| 5,116,225 A | 5/1992 | Riera |
| 8,641,938 B2 * | 2/2014 | Howe ................. B33Y 40/00 264/16 |

(Continued)

FOREIGN PATENT DOCUMENTS

| DE | 40 19 279 C1 | 1/1992 |
| DE | 10 2013 102 402 A1 | 9/2014 |

(Continued)

OTHER PUBLICATIONS

International Search Report for PCT/ES2016/070030 dated Jul. 22, 2016 [PCT/ISA/210].

(Continued)

*Primary Examiner* — Yogesh P Patel
(74) *Attorney, Agent, or Firm* — Sughrue Mion, PLLC

(57) ABSTRACT

A method for manufacturing a dental structure, a dental structure and a dental assembly, formed by a structure screwed on a dental implant relates to a manufacturing method of a dental structure intended to be located and screwed on a previously osseointegrated dental implant, as well as to the structure obtained according to said method and to the dental assembly formed by said structure and implant.

7 Claims, 4 Drawing Sheets

(51) Int. Cl.
*A61C 13/00* (2006.01)
*B29L 31/00* (2006.01)

(52) U.S. Cl.
CPC ........ *A61C 8/0069* (2013.01); *A61C 13/0004* (2013.01); *A61C 13/0006* (2013.01); *A61C 13/08* (2013.01); *B29C 2793/00* (2013.01); *B29L 2031/7536* (2013.01)

(58) Field of Classification Search
USPC ..................................... 433/172–176; 264/16
See application file for complete search history.

(56) References Cited

U.S. PATENT DOCUMENTS

| | | | | |
|---|---|---|---|---|
| 2008/0182227 | A1* | 7/2008 | Wolf | A61C 8/0066 433/174 |
| 2010/0203476 | A1* | 8/2010 | Studer | A61C 8/0087 433/173 |
| 2010/0297583 | A1* | 11/2010 | Benzon | A61C 8/0068 433/174 |
| 2011/0217675 | A1* | 9/2011 | Farre | A61C 8/0089 433/172 |
| 2014/0186797 | A1* | 7/2014 | Haus | A61C 8/0068 433/173 |
| 2016/0022390 | A1* | 1/2016 | Spindler | A61C 8/0068 433/167 |
| 2016/0081772 | A1 | 3/2016 | Schweiger | |
| 2016/0206408 | A1 | 7/2016 | Spindler et al. | |
| 2019/0175310 | A1* | 6/2019 | Zipprich | A61C 8/0068 |

FOREIGN PATENT DOCUMENTS

| | | |
|---|---|---|
| DE | 10 2013 013 565 A1 | 1/2015 |
| DE | 10 2013 014 660 A1 | 3/2015 |
| EP | 3 287 094 A1 | 2/2018 |
| ES | 2 345 636 T3 | 9/2010 |
| WO | 2008/024062 A2 | 2/2008 |
| WO | 2013/004387 A1 | 1/2013 |

OTHER PUBLICATIONS

Groovex, "Groove Milling", YouTube link: https://www.youtube.com/watch?v=vrFzHJUXjvk&feature=youtu.be, 2011, 1 page total.

Groovex, "Groove Milling", YouTube link: https://www.youtube.com/watch?v=nCB1X52JyWs&feature=youtu.be, 2013, 1 page total.

* cited by examiner

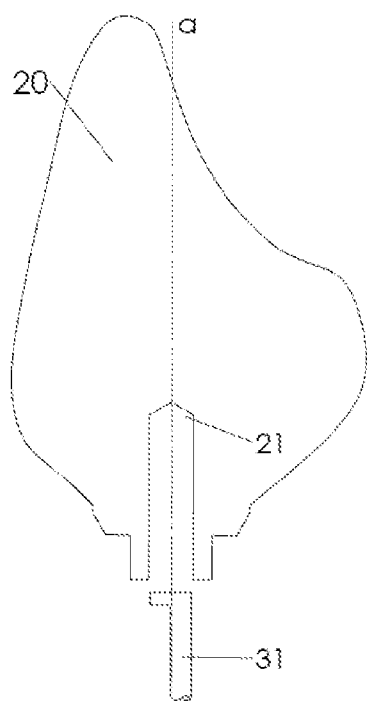
Figure 3
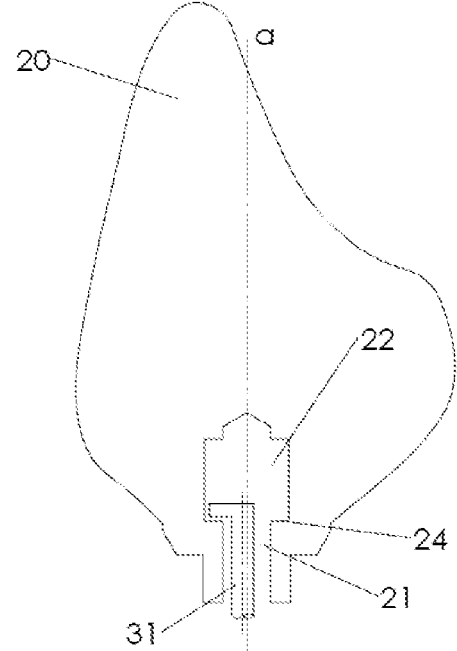
Figure 4.a

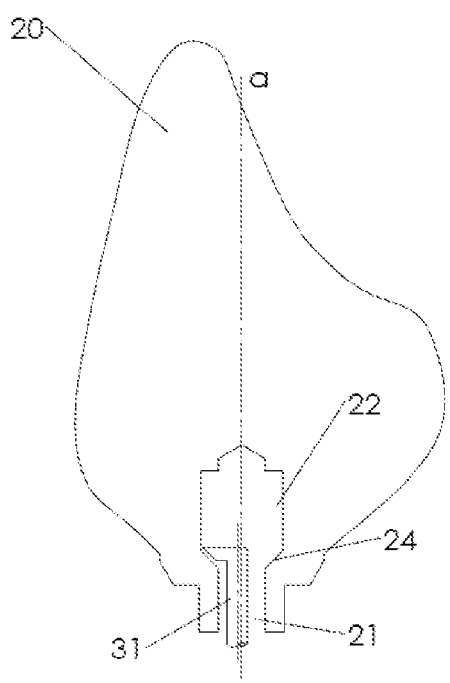
Figure 4.b
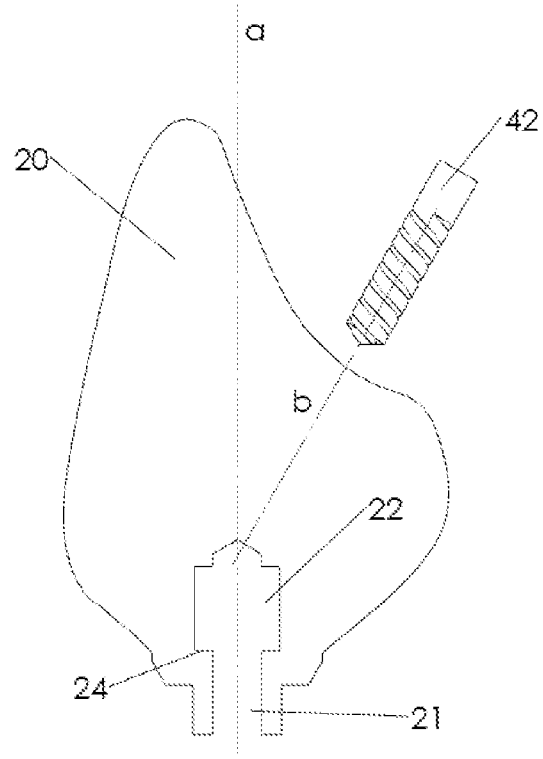
Figure 5

METHOD FOR MANUFACTURING A DENTAL STRUCTURE, DENTAL STRUCTURE OBTAINED AND DENTAL ASSEMBLY FORMED BY A STRUCTURE SCREWED ON A DENTAL IMPLANT

CROSS REFERENCE TO RELATED APPLICATIONS

This application is a National Stage of International Application No. PCT/ES2016/070030 filed Jan. 21, 2016.

OBJECT OF THE INVENTION

The present invention, a method for manufacturing a dental structure, a dental structure obtained according to the aforementioned method and a dental assembly, formed by a structure screwed on a dental implant, relates to a manufacturing method of a dental structure intended to be located and screwed on a previously osseointegrated dental implant, as well as to the structure obtained according to said method and to the dental assembly formed by said structure and implant.

The field of application of the invention is the dental sector and, more specifically, the manufacture of custom dental implants.

BACKGROUND OF THE INVENTION

The aim of a dental implant is to replace a lost dental root with a medical prosthesis, with the resulting restoration, both in terms of aesthetics and dental functionality. When an implant is placed in the mouth, there may be a lack of bone for the implant to have a solid fastening, which means that in order for the positioning to be optimal, it must be placed forming an angle, such that the axis of the implant, and therefore the outlet of the screw that will hold the dental prosthesis projects towards the vestibular face, compromising aesthetics and functionality.

Although several solutions to this problem have existed for several years, such as the use of fixed angled pillars and fixed cementable custom roots on previously machined pillars, it has been CAD-CAM (Computer-Aided Design and Computer-Aided Manufacturing) that has enabled the manufacture of structures for dental prostheses, eliminating all of the drawbacks of prior techniques. One of the structures manufactured using CAD-CAM are individualised roots, bridges or complete upper or lower arches with an emergency profile and shape customised to each patient and situation, which are subsequently screwed to the dental implant or implants. Likewise, this technology has enabled dental prostheses or dental structures to be made without angled intermediate elements. The resulting problem of this technique is that not only the connection itself of the implant must be machined in said dental structure but also the seat of the screw head that holds the structure to the implant inside an angled channel made in the structure.

The current milling techniques for the seat of the screw, such as the one described in Spanish patent ES2345636-T3, for example, have several limitations, which are mainly derived from the milling process of the seat of the screw inside the channel, since said channel is only made from the same direction through which the definitive screw enters that fastens the dental prosthesis or structure to the implant. In this way, an oversized entrance channel for the screw is obtained which structurally affects the prosthesis and limits the manufacturing of more complicated situations. Likewise, they only allow seats for screws with conical heads with limitations or hemispherical heads, since as the entrance channel of the milling tool is angled, it is only possible to mill with a ball nose tool, thus preventing the creation of a straight seat or conical seats.

Therefore, there is a need for a new technique for manufacturing dental structures that minimise the diameter of the channel and in turn enable the placement of screws with a straight and conical seat without limitations.

DESCRIPTION OF THE INVENTION

In accordance with the foregoing, the present invention is intended to eliminate several of the aforementioned drawbacks and offer a manufacturing method, the result of which is a dental prosthesis or structure that may be screwed on implants. The structures of this type are characterised in that the axis of the entrance channel of the screw in the structure does not coincide with the central axis of the dental implant. Likewise, said structures are made up of an individual raw body or block that is transformed into a dental piece through machining, which is then placed on one or several dental implants. Dental structure should be understood as any dental prosthesis, which may be an individual crown, bridge, bar, complete or any dental system that connects with an implant.

Therefore, a first object of the invention is a manufacturing method of a dental structure according to claim 1. Specifically, said method comprises the following stages:

Drilling a machined body in the shape of a dental piece along a first axis, creating a first channel with a first diameter, Inserting a tool into said first channel that may vary in shape depending on the type of seat for a screw for the subsequent fastening of the structure, and Machining the inside of the first channel, widening the diameter thereof in at least a second section, determining a first section with a first diameter and a second section with a second diameter, which is greater than the first.

The dental structure is completed with the drilling of said body, creating a second channel, which connects with the first channel, along a second axis that forms an angle greater than 0° and less than or equal to 45° with the first axis of the first channel. Said second channel may be performed either before or after the drilling of the first channel.

The structure comprises a shape that varies depending on the function to carry out, and is generally divided into two portions, an aesthetic portion and another portion that is for connecting to the implant.

A second object of the invention is a dental structure according to claim 5, and specifically obtained according to method claims.

A third object of the invention is a dental assembly, according to claim 6, formed by the structure object of the invention and a dental implant.

DESCRIPTION OF THE DRAWINGS

In order to complete the present description, with the aim of making the characteristics of the invention more readily understandable, the present specification is accompanied by a set of figures by way of illustration and not limitation:

FIGS. 1 to 6 show the manufacturing stages of the structure object of the invention, showing the finished structure in FIG. 6.

PREFERRED EMBODIMENT

Figure 1:
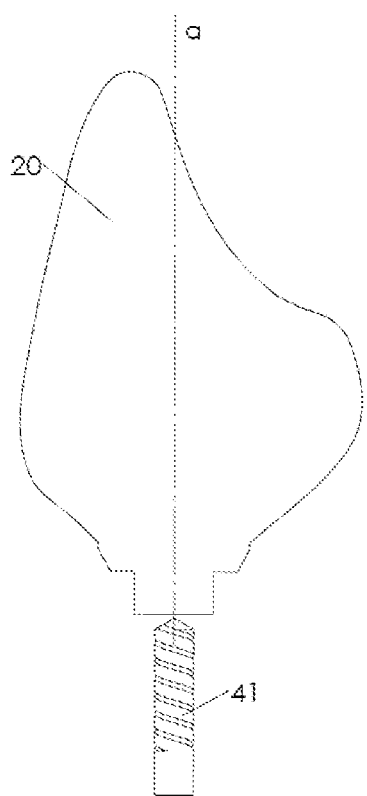
Figure 2:
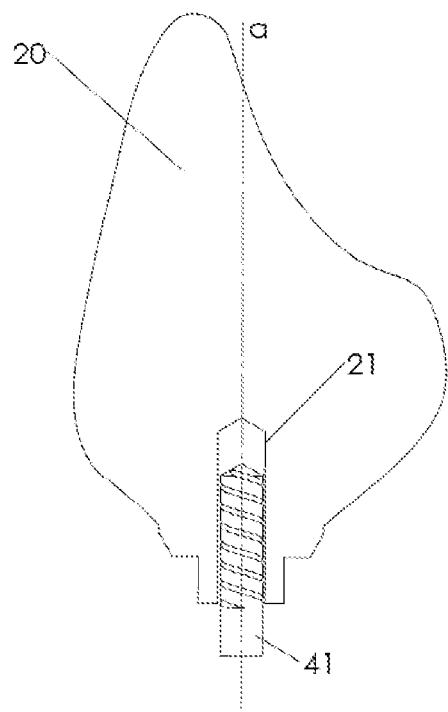
Figure 6:
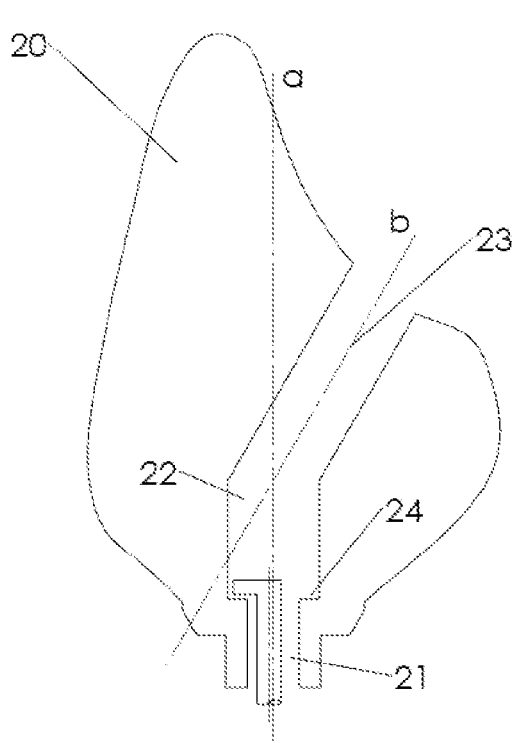
Figure 7:
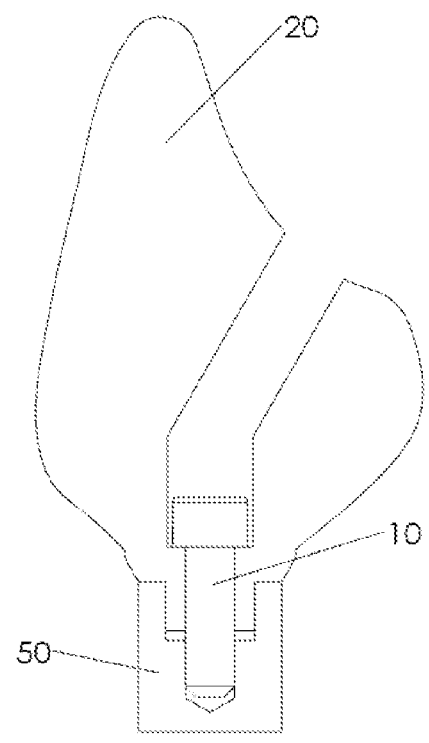
FIG. 7 shows a dental assembly object of the invention comprising a structure obtained according to the manufacturing method of the present invention and a dental implant.

In light of the aforementioned figures, a description of a preferred embodiment of the present invention is provided below.

The embodiment describes the manufacturing process of a dental prosthesis or structure 20, made of metal, preferably chosen from among zirconium, titanium alloys, cobalt-chromium or other biocompatible materials, according to the present invention.

Using a body in the shape of a dental piece 20, the same is drilled from below with a drill bit 41 to create a first channel 21 along a first axis "a" and with a first diameter. Said first axis "a" coincides with the axis of the osseointegrated dental implant 50 to which the dental structure 20 is subsequently screwed to.

Once this first channel 21 with a specific length is made, a milling tool 31 is inserted therein to machine this first channel 21, said tool 31 preferably being L-shaped, as seen in FIG. 4.a. Alternatively, and as may be seen in FIG. 4.b, the tool 31 is L-shaped but slightly different in order to create a seat for a conical screw head. The milling tool 31 is inserted in the first channel 21, and once the specific distance from the entrance of the first channel 21 in the piece 20 is reached, and which determines a first section 21 of the first channel 21, said tool 31 starts to move radially, thus widening the diameter of the first channel 21 and starting to create, along with a translation movement along the first axis "a", a second section 22 in the first channel 21. During the creation of this second section 22, the axis of the tool 31 coincides with the axis "a" of the first channel 21. This milling of the inside of the first channel 21 creates a step 24 between the first section 21 and the second section 22 that forms a seat 24 for the screw 10 responsible for fastening the structure 20 to the osseointegrated dental implant 50, and specifically, a seat 24 for the head of said screw 10. Depending on the shape of said milling tool, the seat 24 is straight (shown in FIGS. 4.a., 5 and 6), such that the support surface of the head of the screw 10 is perpendicular to the wall of the first 21 and second 22 sections of the first channel 21, or inclined (shown in FIG. 4.b.) with regards to the walls of said two sections 21, 22.

Subsequently, a second drilling is carried out in the upper portion of the body 20, creating a second channel 23, which crosses the first channel 21, along a second axis "b". Said second axis "b" forms an angle greater than 0° and less than or equal to 45° with the first axis "a". This second channel 23 may be carried out before or after the first channel 21, and if it is made after the first channel 21, it may be made before or after the machining 24 of the inside of said first channel 21.

After said second channel 23 has been carried out, the dental structure that is also an object of the present invention is now finished.

The first diameter of the first channel 21, which coincides with the diameter of the first section 21 of said first channel, is smaller than the diameter of the second section 22 of the first channel and the diameter of the second channel. In fact, this first diameter is equal to or slightly greater than the diameter of the thread of the screw 10 that fastens the structure 20 to the implant 50. Likewise, the second diameter of the first channel 21, which is equivalent to the diameter of the second section 22 of the first channel, is equal to or slightly greater than the diameter of the head of the aforementioned screw. Likewise, the second diameter of the first channel 21, which is equivalent to the diameter of the second section 22 of the first channel, is equal to or slightly greater than the diameter of the head of the aforementioned screw.

In this way, and through the manufacturing method described, the material removed from inside the body 20 of the structure is decreased, reducing the structural weakening thereof with regards to the existing methods, since the material removed from the inside is the minimum necessary for the screw 10 to pass through the structure 20, and not for the tool to pass through, which is larger.

As both channels 21, 22 are in communication, a continuous channel is provided from the upper portion of the body 20 of the structure for the screw 10, said continuous channel being formed by two axes that do not coincide, "a" and "b", such that the first axis "a" is vertical to the implant 50 and the second axis "b" is inclined with respect to said first axis "a", having at least two differentiated diameters, one that enables the thread of the screw 10 to pass through and another that enables the head of the screw 10 to pass through, said continuous channel having a seat 24 for the head of the screw 10, the screw 10 thus being held between the two channels 21, 23.

Once the dental structure has been manufactured, it is assembled on an osseointegrated implant 50 by means of the fastening screw 10, determining a dental assembly, which is also an object of the present invention. Said dental assembly is therefore formed by the structure 20, a dental implant 50 and a fastening screw 10.

The thread of the screw 10 has a slightly smaller diameter than the diameter of the first section 21 of the first channel 21 of the structure and the head of said screw 10 has a slightly smaller diameter than the diameter of the second channel 23 of the structure. This relationship between the diameters enables the screw 10 to be inserted from the upper portion of the piece 20, such that it runs along the second channel 23 and the second section 22 of the first channel 21 until the head of the screw 10 reaches the seat 23 that prevents the screw 10 from exiting the lower portion of the piece 20. That is to say, the screw 10 has a thread with a diameter in relation to the diameter of the first section 21 of the first channel 21 of the structure and a head that has a diameter in relation to the diameter of the second channel 23 of the structure 20.

Subsequently, and by means of the corresponding tool, which is inserted through the second channel 23 until it reaches the head of the screw 10, torque is applied to said head in order to screw the structure 20 to the osseointegrated dental implant 50.

It must be taken into account that instead of assembling the structure 20 on the dental implant 50, it may be assembled on an intermediate piece.

The invention claimed is:

1. A method for manufacturing a dental structure from an individual raw body that is transformed into a dental piece for the subsequent placement thereof by screwing on one or several osseointegrated dental implants with an axis, comprising the following stages:

drilling the body, through a lower portion of the body that is to be placed on the dental implant, along a first axis (a), coinciding with the axis of the dental implant, creating a first channel with a first diameter opening at one end of the first channel and terminating inside the body at a closed end of the first channel, inserting a milling tool from below into said first channel through the opening of the first channel, the milling tool having a shape according to the seat of a screw to be inserted in the first channel, to machine the channel and form the seat of the screw, machining the inside of the first channel with the milling tool inserted into the opening of the first channel and thereby widening the first channel in at least a second section of the first channel to a second diameter, thereby forming a first section with the first diameter and the second section with the second diameter that is greater than the first diameter, the second section located further from the first section relative to the opening of the first channel, and drilling the body, creating a second channel along a second axis (b) that forms an angle greater than 0° and less than or equal to 45° with the first axis (a) of the first channel, connecting said second channel with said first channel.

2. The method, according to claim 1, wherein a diameter of the second channel is greater than the first diameter of the first channel.

3. The method, according to claim 1, wherein the milling tool machines a straight seat between the first section and the second section of the first channel, which is perpendicular with respect to the walls of the channel.

4. The method, according to claim 1, wherein the milling tool machines a conical seat between the first section and the second section of the first channel, which is inclined with respect to the walls of the channel.

5. The method, according to claim 1, wherein the second channel is performed before or after the first channel.

6. The method, according to claim 1, wherein second channel has a constant diameter that is larger than the first diameter of the first channel.

7. The method, according to claim 1, wherein the first section is located further from the seat relative to the opening of the first channel.

* * * * *